(12) United States Patent
Ye

(10) Patent No.: US 11,120,656 B2
(45) Date of Patent: Sep. 14, 2021

(54) METHODS AND SYSTEMS FOR OFFLINE VERIFICATION CODE GENERATION BASED ON SMART DOOR LOCK SYSTEM

(71) Applicant: YUNDING NETWORK TECHNOLOGY (BEIJING) CO., LTD., Beijing (CN)

(72) Inventor: Yun Ye, Beijing (CN)

(73) Assignee: YUNDING NETWORK TECHNOLOGY (BEIJING) CO., LTD., Beijing (CN)

(*) Notice: Subject to any disclaimer, the term of this patent is extended or adjusted under 35 U.S.C. 154(b) by 0 days.

(21) Appl. No.: 16/506,011

(22) Filed: Jul. 9, 2019

(65) Prior Publication Data
US 2019/0371105 A1 Dec. 5, 2019

Related U.S. Application Data

(63) Continuation of application No. PCT/CN2018/071918, filed on Jan. 9, 2018.

(30) Foreign Application Priority Data

Jan. 9, 2017 (CN) .......................... 201710014020.8

(51) Int. Cl.
 *G07C 9/00* (2020.01)
 *H04L 29/08* (2006.01)
 *H04W 4/20* (2018.01)

(52) U.S. Cl.
 CPC ..... *G07C 9/00904* (2013.01); *G07C 9/00817* (2013.01); *H04L 67/10* (2013.01); *H04W 4/20* (2013.01); *G07C 2009/00825* (2013.01)

(58) Field of Classification Search
 CPC ............ G07C 9/00904; G07C 9/00817; G07C 2209/00412; G07C 2009/00825;
 (Continued)

(56) References Cited

U.S. PATENT DOCUMENTS

2013/0127593 A1 5/2013 Kuenzi et al.
2013/0212248 A1* 8/2013 Neafsey .................. H04L 63/08
 709/223
(Continued)

FOREIGN PATENT DOCUMENTS

CN 102426715 A 4/2012
CN 103489233 A 1/2014
(Continued)

OTHER PUBLICATIONS

International Search Report in PCT/CN2018/071918 dated Mar. 27, 2018, 7 pages.
(Continued)

*Primary Examiner* — Vernal U Brown
(74) *Attorney, Agent, or Firm* — Metis IP LLC

(57) ABSTRACT

The present disclosure provides a method and a system for offline verification code generation based on a smart door lock system. The method may include in response to an unlocking event, recording, by a mobile terminal, a trigger time of the unlocking event; in response to the unlocking event, sending, by the mobile terminal, a request for unlocking verification information to a cloud server, wherein the request for the unlocking verification information is used to request the cloud server to return a verification code of a smart door lock, and the unlocking verification information includes a private key seed of the smart door lock and the trigger time; and receiving, by the mobile terminal, the verification code of the smart door lock for opening the smart door lock generated by the cloud server based on the private key seed and the trigger time.

10 Claims, 7 Drawing Sheets

(58) Field of Classification Search
CPC .......... G07C 2009/00412; G07C 2009/00388; H04L 63/068; H04L 67/10
USPC ........................................................ 340/5.2
See application file for complete search history.

(56) References Cited

U.S. PATENT DOCUMENTS

| | | | |
|---|---|---|---|
| 2014/0375422 | A1 | 12/2014 | Huber et al. |
| 2016/0035163 | A1* | 2/2016 | Conrad .............. G07C 9/00309 340/5.61 |
| 2016/0358397 | A1 | 12/2016 | Kristensen et al. |

FOREIGN PATENT DOCUMENTS

| | | | |
|---|---|---|---|
| CN | 104022873 | A | 9/2014 |
| CN | 104200593 | A | 12/2014 |
| CN | 104660719 | A | 5/2015 |
| CN | 104806085 | A | 7/2015 |
| CN | 105279832 | A | 1/2016 |
| CN | 205140033 | U | 4/2016 |
| CN | 106097487 | A | 11/2016 |
| CN | 106898064 | A | 6/2017 |
| WO | 0231778 | A1 | 4/2002 |
| WO | 2015079203 | A1 | 6/2015 |

OTHER PUBLICATIONS

Written Opinion in PCT/CN2018/071918 dated Mar. 27, 2018, 11 pages.
The Extended European Search Report in European Application No. 18736711.5 dated Dec. 9, 2019, 10 pages.

* cited by examiner

METHODS AND SYSTEMS FOR OFFLINE VERIFICATION CODE GENERATION BASED ON SMART DOOR LOCK SYSTEM

CROSS-REFERENCE TO RELATED APPLICATIONS

This application is a U.S. continuation application of International Patent Application Ser. No. PCT/CN2018/071918 filed on Jan. 9, 2018, which claims priority to Chinese Patent Application No. 201710014020.8, "a method and system for generating offline verification code based on smart door lock system" filed on Jan. 9, 2017, the contents of each of which are incorporated herein by reference.

TECHNICAL FIELD

The present disclosure relates to a method and system for offline verification code generation based on a smart door lock system which belongs to the intelligent control field, and also belongs to the security technology field and the smart home field.

BACKGROUND

Currently, smart door locks are usually opened using passwords, Bluetooth or NFC, and voices. The password for opening a smart door lock may be usually a temporary password or a permanent password issued remotely. Generally, a gateway may be connected to an Internet, and the smart door lock communicates with the gateway through wireless technology. A user sends a command to add a password to the background of a cloud server through a mobile phone or a webpage. The command is transmitted to the gateway through the Internet and then transmitted to the smart door lock. The smart door lock generates the password successfully. However, due to real-world problems, such as a power outage at the gateway, a network failure at home, or a user who does not have a gateway installed, the password may not be issued remotely.

SUMMARY

The purpose of the present disclosure is to overcome the shortcomings and propose a method for offline verification code generation based on a smart door lock system.

According to a first aspect, the present disclosure provides a method for offline verification code generation based on a smart door lock system, the method including:
  in response to an unlocking event, recording, by a mobile terminal, a trigger time of the unlocking event;
  in response to the unlocking event, sending, by the mobile terminal, a request for unlocking verification information to a cloud server, wherein the request for the unlocking verification information is used to request the cloud server to return a verification code of a smart door lock, and the unlocking verification information includes a private key seed and the trigger time; and
  receiving, by the mobile terminal, the verification code of the smart door lock for opening the smart door lock generated by the cloud server based on the private key seed and the trigger time.

In some embodiments, the unlocking event may include at least one of a click confirmation operation, a sliding operation, or a login operation by inputting a password or authentication information.

According to a second aspect, the present disclosure also provides a method for offline verification code generation based on a smart door lock system, the method including:
  receiving, by a cloud server, a request for unlocking verification information from a mobile terminal, the unlocking verification information including a private key seed of a smart door lock and a trigger time recorded by the mobile terminal in response to an unlocking event; and
  generating, by the cloud server, a verification code of the smart door lock after a matching verification of the private key seed is successful and returning the verification code to the mobile terminal for opening the smart door lock.

In some embodiments, the cloud server may be provided with a preset private key seed database configured to store a private key seed of each smart door lock, and before generating the verification code of the smart door lock after the matching verification of the private key seed is successful, the method may further include:
  comparing, by the cloud server, the private key seed and the stored private key seed of each smart door lock in the preset private key seed database; and determining that the matching verification of the private key seed is successful if a comparison is successful.

In some embodiments, the generating, by the cloud server, the verification code of the smart door lock and returning the verification code to the mobile terminal for opening the smart door lock may include:
  generating, by the cloud server, the verification code using a preset first verification code generation algorithm based on the private key seed and the trigger time within a time period which the trigger time belongs to; and
  returning the verification code to the mobile terminal for opening the smart door.

In some embodiments, the method may further include:
  generating, by the cloud server, a password generation instruction, wherein the password generation instruction is used to make the verification code of the smart door lock take effect in the smart door lock; and
  returning the password generation instruction to the mobile terminal.

In some embodiments, the generating, by the cloud server, the password generation instruction may include:
  generating, by the cloud server, the password generation instruction based on a start code, a command code, a type code, a validity period code, a password, a password ID, a time factor, and a private key seed.

According to a third aspect, the present disclosure also provides a method for offline verification code generation based on a smart door lock system, the method including:
  generating, by a smart door lock, a verification code for a current time period using a preset first verification code generation algorithm based on a private key seed of the smart door lock; and
  in response to receipt of an inputted verification code, comparing the inputted verification code with the verification code for the current time period, the smart door lock being unlocked if the inputted verification code is same as the verification code for the current time period.

In some embodiments, the method may further include:
  making the verification code for the current time period take effect in response to receipt of a password generation instruction.

According to a fourth aspect, the present disclosure also provides a mobile terminal, the mobile terminal including:

a recording module configured to in response to an unlocking event, record a trigger time of the unlocking event;

a first sending module configured to in response to the unlocking event, send a request for unlocking verification information to a cloud server, wherein the request for the unlocking verification information is used to request the cloud server to return a verification code of a smart door lock, and the unlocking verification information includes a private key seed of the smart door lock and the trigger time of the unlocking event; and a first receiving module configured to receive the verification code of the smart door lock for opening the smart door lock generated by the cloud server based on the private key seed and the trigger time.

In some embodiments, the unlocking event may include at least one of a click confirmation operation, a sliding operation, or a login operation by inputting a password or authentication information.

According to a fifth aspect, the present disclosure also provides a cloud server, the cloud server including:

a second receiving module configured to receive a request for unlocking verification information from a mobile terminal, the unlocking verification information including a private key seed of a smart door lock and a trigger time recorded by the mobile terminal in response to an unlocking event; and a first generating module configured to generate a verification code of a smart door lock after a matching verification of the private key seed is successful and returning the verification code to the mobile terminal for opening the smart door lock.

In some embodiments, the cloud server may be provided with a preset private key seed database configured to store a private key seed of each smart door lock; and the cloud server may further include:

a verification module configured to compare the private key seed and the stored private key seed of each smart door lock in the preset private key seed database, and determine that the matching verification of the private key seed is successful if a comparison is successful.

In some embodiments, the first generating module may include:

a generating sub-module configured to generate a verification code using a preset first verification code generation algorithm based on the private key seed and the trigger time within a time period which the trigger time belongs to; and a returning sub-module configured to return the verification code to the mobile terminal for opening the smart door.

In some embodiments, the cloud server may further include:

a second generating module configured to generate a password generation instruction, wherein the password generation instruction is used to make the verification code of the smart door lock take effect in the smart door lock; and a returning module configured to return the password generation instruction to the mobile terminal.

In some embodiments, the second generating module may be configured to:

generate the password generation instruction based on a start code, a command code, a type code, a validity period code, a password, a password ID, a time factor, and a private key seed.

According to a sixth aspect, the present disclosure also provides a smart door lock, the smart door lock including:

a third generating module configured to generate a verification code for a current time period using a preset first verification code generation algorithm based on a private key seed of the smart door lock; and a comparing module configured to in response to receipt of an inputted verification code, compare the inputted verification code with the verification code for the current time period, the smart door lock being unlocked if the inputted verification code is same as the verification code for the current time period.

In some embodiments, the smart door lock may further include:

an effective module configured to make the verification code for the current time period take effect in response to receipt of a password generation instruction.

According to a seventh aspect, the present disclosure also provides a smart door lock system, the smart door lock system including a mobile terminal, a cloud server, and a smart door lock, wherein the mobile terminal is configured to record a trigger time of the unlocking event in response to an unlocking event, send a request for unlocking verification information to a cloud server, wherein the request for the unlocking verification information is used to request the cloud server to return a verification code of a smart door lock, and the unlocking verification information includes a private key seed of the smart door lock and the trigger time;

the cloud server is configured to generate the verification code of the smart door lock after a matching verification of the private key seed is successful and return the verification code to the mobile terminal for opening the smart door lock; and the smart door lock is configured to generate a verification code for a current time period using a preset first verification code generation algorithm based on a private key seed of the smart door lock; in response to receipt of an inputted verification code, compare the inputted verification code with the verification code for the current time period, the smart door lock being locked if the inputted verification code is the same as the verification code for the current time period.

The methods for generating the offline verification code based on a smart door lock system provided by the present disclosure provide may obtain a valid temporary password remotely, or obtain a password generation instruction when the smart door lock does not have a communication function. For example, the password may be enabled by entering the password generation instruction via a door lock panel. The method may solve the problems that the password cannot be issued remotely when gateway power outage, wireless failure or without the installation of the gateway. In the meantime, the methods may not need to install a communication module inside the smart door lock for interacting with a gateway and a cloud server, which may greatly reduce energy consumption.

The description is only an overview of the present disclosure technical solution. In order to be able to understand the technical means of the present disclosure more clearly, it may be implemented in accordance with the contents of the specification, and in order to make the above and other purposes, features and advantages of the present disclosure more understandable, the following is a specific implementation of the present disclosure.

BRIEF DESCRIPTION OF THE DRAWINGS

Various other advantages and benefits will become apparent to the skilled in the art by reading the following detailed descriptions of the preferred embodiments. The drawings are only for the purpose of illustrating the preferred embodiments and are not considered as a limitation of the present disclosure. Also, like reference numerals represent similar structures throughout the several views of the drawings. In the drawings.

DETAILED DESCRIPTION

Figure 1:
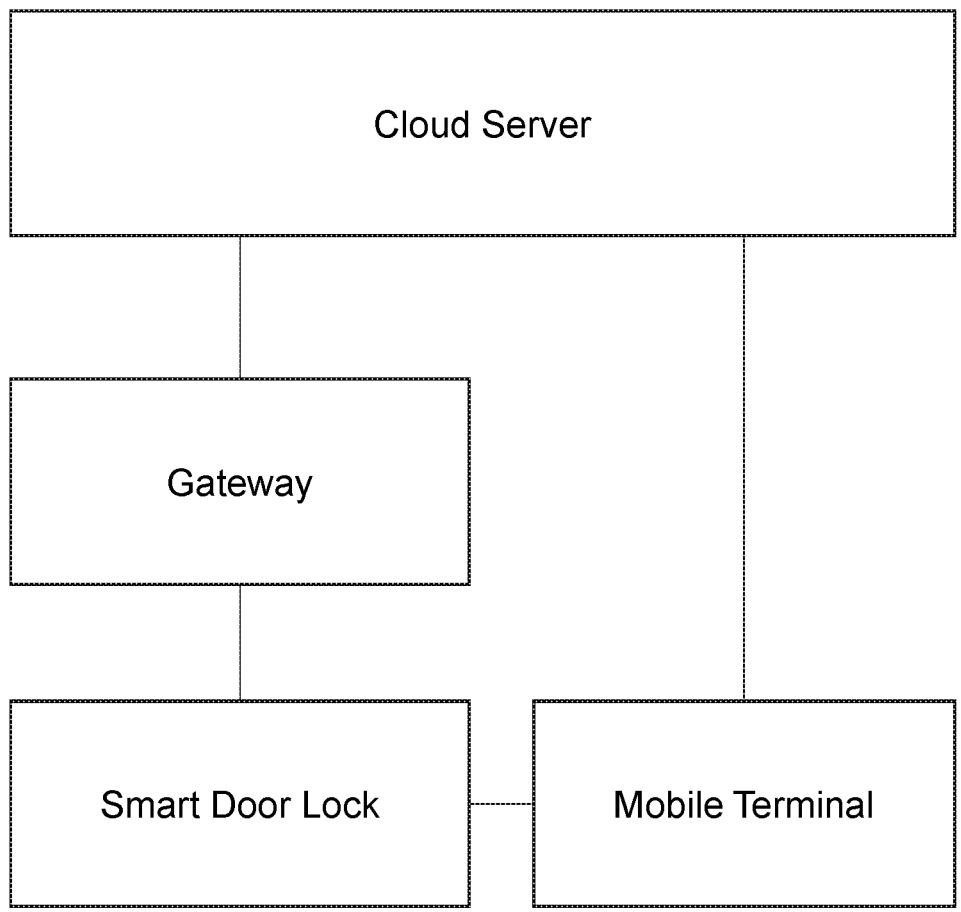
FIG. 1 is a block diagram of a smart door lock system based on dynamic password in the prior art.

The exemplary embodiments of the present disclosure will be described in more detail below with reference to the accompanying drawings. While exemplary embodiments of the present disclosure are shown in the drawings, it should be understood that the present disclosure may be embodied in various forms and not limited by the embodiments set forth herein. On the contrary, these embodiments are provided so that this present disclosure will be more fully understood, and the scope of the present disclosure may be fully disclosed to those skilled in the art.

FIG. 1 shows a smart door lock system based on a dynamic password in the prior art. The implementation process of which needs to rely on one or more wireless communication modules in a smart door lock to realize the request and sending of a password through a gateway and a cloud server, which may cause technical problems or defects including: first, the increase of energy consumption of the smart door lock as the wireless communication modules needs a long time and a large amount of power supply; second, the unavailability of the password remotely issued for the interactive terminal as power failure, the gateway outage, or the home network failure.

According to the problems described above, the present disclosure provides a method for offline verification code generation based on a smart door lock system. The method may obtain a valid temporary password remotely, or obtain a password generation instruction when the smart door lock does not have a communication function. For example, the password may be enabled by entering the password generation instruction via a door lock panel. The method may solve the problems that the password cannot be issued remotely when gateway power outage, wireless failure or without the installation of the gateway. In the meantime, the methods may not need to install a communication module inside the smart door lock for interacting with a gateway and a cloud server, which may greatly reduce energy consumption.

Figure 2:
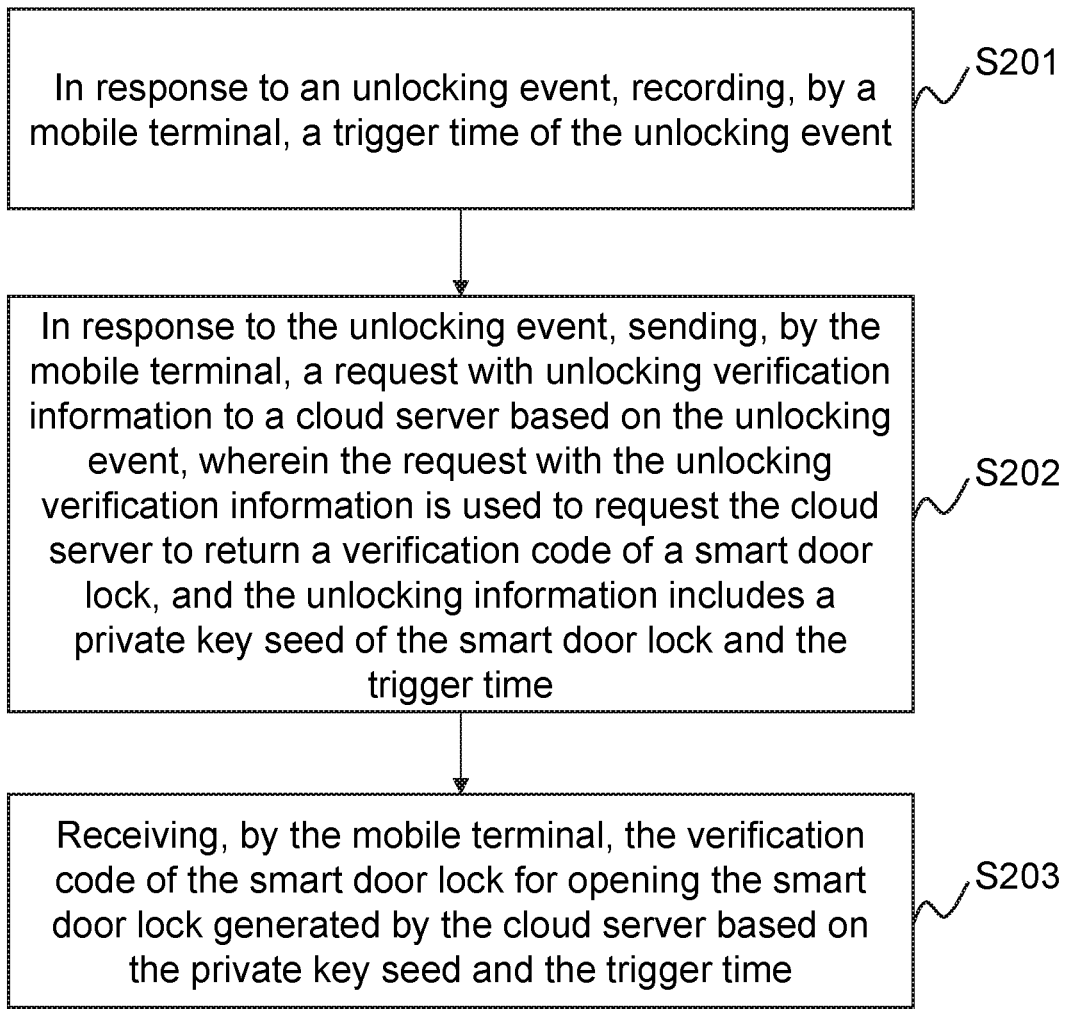
FIG. 2 is a flowchart illustrating a process for offline verification code generation based on a smart door lock system according to some embodiments of the present disclosure.

FIG. 2 illustrates a process for offline verification code generation based on a smart door lock system implemented on a mobile terminal according to some embodiments of the present disclosure. The process may include:

S201: in response to an unlocking event, recording, by the mobile terminal, a trigger time of the unlocking event.

The unlocking event may include an operation of a user, for example, a click operation for confirmation, a sliding operation, a login operation by inputting a password or authentication information, etc. When the mobile terminal detects the unlocking event, the mobile terminal may record the trigger time of the unlocking event in a background of the mobile terminal. The trigger time may be used to obtain a verification code of a smart door lock.

The mobile terminal may include a smart mobile device, such as a mobile phone, an IPAD, a laptop computer, a smartwatch, a smart bracelet, etc. For example, when the user clicks an unlocking confirmation button or slides an unlocking switch on a display on a smartphone, an IPAD, a mobile laptop computer, etc., or enters a password or authentication information through an application implemented on the mobile terminal or a webpage to log on, the unlocking event may be triggered. The unlocking event may also be triggered by a smartwatch, a smart bracelet, etc., and the trigger time may be recorded in the background of the mobile terminal.

S202: sending, by the mobile terminal, a request for unlocking verification information to a cloud server in response to the unlocking event. The request for the unlocking verification information may be used to request the cloud server to return the verification code of the smart door lock. The unlocking verification information may include a private key seed of the smart door lock and/or the trigger time. In some embodiments, the trigger time may refer to a current time recorded by the mobile terminal when the unlocking event happens. The trigger time may be recorded by the mobile terminal according to a timing mechanism of the mobile terminal.

In some embodiments, the cloud server may be provided with a preset private key seed database. The preset private key seed database may be configured to store multiple private key seeds of multiple smart door locks. A private key seed of each smart door lock may include a secret key which is unique and non-repetitive. As used herein, a private key seed of a smart door lock stored in the preset private key seed database may be also referred to as a reference private key seed. Each smart door lock may include one single private key seed. A corresponding relationship between the reference preset private key seed and each smart door lock may be stored in the preset private key seed database. A mobile terminal may also store a private key seed after the mobile terminal is bounded to a smart door lock with the private key seed. In other words, the mobile terminal may include a corresponding relationship with the private key seed of the smart door lock. The mobile terminal may obtain the private key seed of the smart door lock based on the corresponding relationship between the private key seed of the smart door lock and the mobile terminal. In some embodiments, the mobile terminal may include a corresponding relationship with the private key seed of the smart door lock and the smart door lock. The mobile terminal may obtain the private key seed of the smart door lock based on the corresponding relationship between the private key seed of the smart door lock, the mobile terminal, and the smart door lock. In some embodiments, the corresponding relationship between the private key seed of the smart door lock, the mobile terminal, and/or the smart door lock may be stored in the preset private key seed database or any other storage.

The mobile terminal may send the request for the unlocking verification information to the cloud server in response to detect the unlocking event for request the cloud server to return the verification code of the smart door lock. The unlocking verification information may include the private key seed of the smart door lock and/or the trigger time of the unlocking event. The private key seed may include one single corresponding relationship with the smart door lock. The private key seed of a smart door lock may be generated, written to the smart door lock, and stored in the cloud server simultaneously when the smart door lock leaves a factory. As used herein, the private key seed of a smart door lock written to and stored in the smart door lock (e.g., a storage device installed in the smart door lock) may be also referred to as a local private key seed. The local private key seed may be used by the smart door lock for generating a verification code which may be referred to as a reference verification code. The private key seed of each smart door lock may be different to ensure the security of a dynamic password of each smart door lock. Even if an encryption algorithm is leaked and a hacker gets the private key of a specific smart door lock, it will not threaten smart door locks of other users.

S203: receiving a verification code of the smart door lock for opening the smart door lock generated by the cloud server based on the private key seed and the trigger time.

The cloud server may generate the verification code of the smart door lock after receiving the private key seed and the trigger time from the mobile terminal. The cloud server may return the verification code to the mobile terminal. A user may use the verification code displayed on the mobile terminal. For example, the user may input the verification code into the smart door lock via a user interface implemented on the smart door lock and displayed by a panel of the smart door lock. As another example, the user may input the verification code into the smart door lock via a panel connected with the smart door via a wireless connection (e.g., Bluetooth). The smart door lock (e.g., a processor installed in the smart door lock) may generate a reference verification code based on the local private key seed of the smart door lock. The smart door lock (e.g., a processor installed in the smart door lock) may compare the reference verification code with the inputted verification code. The smart door lock may be unlocked in response to a determination that the reference verification code and the inputted verification code are matched.

According to the process for generating the off-line verification code based on a smart door lock system provided by the present disclosure, the mobile terminal may record the trigger time of the unlocking event in response to the unlocking event, and send the request for the private key seed of the smart door lock and the trigger time to the cloud server, so as to request the cloud server to return the verification code of the smart door lock. After the mobile terminal receives the verification code, the verification code may be used to open the smart door lock. In the case of the smart door lock offline, the embodiments of the present disclosure may obtain the verification code from the cloud server and finish the opening of the smart door lock, which may solve the problem that the password cannot be issued to open the smart door lock when gateway power outage, wireless failure or without the installation of the gateway. Simultaneously, the method does not need to be installed with a communication module inside a lock for interacting with a gateway and a cloud server, which may greatly reduce its own energy consumption.

In addition, the smart door lock system of the present disclosure may only need to install a preset verification code generation algorithm in each time period, generate a verification code (i.e., reference verification code), and store the verification code (i.e., reference verification code) inside of a lock. A communication module for interacting with a gateway and a cloud server may not need to be installed inside the lock, which greatly reduces its energy consumption and reduces its size. Therefore, the smart door lock system can be not restricted by the external network environment and may be opened based on an off-line verification code. The smart door lock system without the communication module may be safe, reliable and independent of the external network environment.

Figure 3:
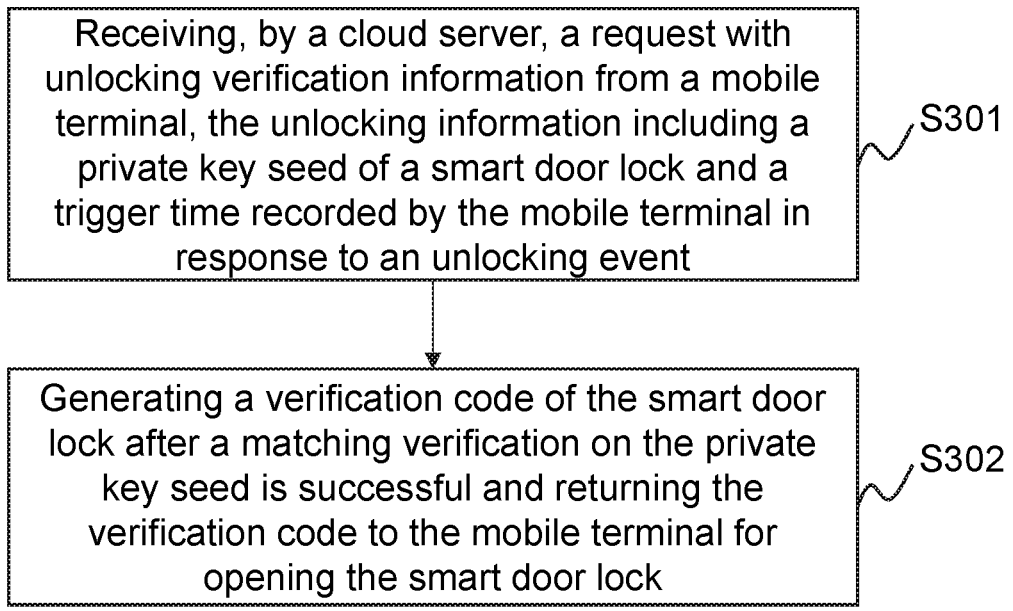
FIG. 3 is a flowchart illustrating another process for offline verification code generation based on a smart door lock system according to some embodiments of the present disclosure.

Corresponding to the above embodiment, the present disclosure provides a process for offline verification code generation based on a smart door lock system implemented on a cloud server with reference to FIG. 3. FIG. 3 illustrates another process for offline verification code generation based on a smart door lock system according to some embodiments of the present disclosure. The process may include:

S301: receiving, by a cloud server, a request for unlocking verification information from a mobile terminal. The unlocking verification information may include a private key seed and/or a trigger time recorded by the mobile terminal in response to an unlocking event.

S301 in the embodiment of the present disclosure may be understood with reference to S201 and S202 in the above-mentioned embodiment, and will not be repeated here.

S302: generating, by the cloud server, a verification code of a smart door lock and returning the verification code of the smart door lock to the mobile terminal for opening the smart door lock after a matching verification of the private key seed is successful.

In some embodiments, after the cloud server receives the request for the unlocking verification information, the cloud server may obtain the private key seed included in the request. The private key seed included in the request may be obtained by the mobile terminal based on a corresponding relationship between the private key seed, the mobile terminal and/or the smart door lock as described in elsewhere in the present disclosure (e.g., FIG. 2 and the descriptions thereof). In some embodiments, the cloud server may compare the obtained private key seed with the stored private key seed (i.e., reference private key seeds) of each smart door lock in the preset private key seed database. If the comparison is successful, i.e., the preset private key seed database stores the obtained private key seed, the matching verification of the obtained private key seed may be successful; otherwise, the matching verification of the obtained private key seed may be unsuccessful. In some embodiments, the cloud server may generate the verification code of the smart door lock and return the verification code of the smart door lock to the mobile terminal for opening the smart door lock after a matching verification of the smart door lock is successful. For example, the mobile terminal may include a corresponding relationship between the smart door lock and the corresponding relationship between the smart door lock and the mobile terminal may be stored in the mobile terminal or any other storage. The mobile terminal may obtain an identity (e.g., an ID number) of the smart door lock based on the corresponding relationship between the smart door lock and the mobile terminal and send the request including the identity (e.g., an ID number) of the smart door lock to the cloud server. The preset private key seed database may store a corresponding relationship between each smart door lock and the reference private key seeds and/or an identity (e.g., an ID number) of the each smart door lock. The cloud server may compare the obtained identity (e.g., an ID number) of the smart door lock from the mobile terminal with the stored identity (e.g., an ID number) of the smart door lock of each smart door lock in the preset private key seed database. If the comparison is successful, i.e., the preset private key seed database stores the obtained identity (e.g., an ID number) of the smart door lock, the matching verification of the obtained private key seed may be successful; otherwise, the matching verification of the obtained private key seed may be unsuccessful.

The cloud server may generate the verification code of the smart door lock and return to the mobile terminal for opening the smart door lock if the matching verification of the obtained private key seed is successful.

In some embodiments of the present disclosure, the verification code of the smart door lock may be generated according to two ways. Details may be provided below.

In one of the two ways, the verification code of the smart door lock may be a dynamic password. Specifically, the cloud server may generate a dynamic password in a preset time period based on the private key seed with the successful matching verification and the trigger time. As used herein, the preset time period may be associated with the trigger time. The trigger time may be also referred to as a current time recorded by the mobile terminal. The preset time period may be also referred to as a current time period. For example, the trigger time may be within the preset time period. As a further example, if the trigger time is 9:45 a.m., the preset time period associated with the trigger time may be 8:00 a.m. to 10:00 a.m., or may be 9:00 a.m. to 10:00 a.m., or may be 9:30 a.m. to 10:00 a.m., etc.

The cloud server may generate the dynamic password using a preset first verification code generation algorithm. The first verification code generation algorithm may include but not is limited to various Hash algorithms. The private key seed and the trigger time received by the cloud server may be as input parameters of the first verification code generation algorithm to generate the verification code of the smart door lock at a current time. The verification code may be a dynamic password. In other words, the verification code of the smart door lock may be different for different time periods. In some embodiments, different trigger times may correspond to different verification codes of the smart door lock generated by the cloud server. For example, different trigger times belonging to different time periods may correspond to different verification codes. In some embodiments, different trigger times may correspond to a same verification code of the smart door lock. For example, different trigger times belonging to a same time period may correspond to a same verification code.

Specifically, the cloud server may determine a time period which the dynamic password the generated verification code of the smart door lock belongs to according to the trigger time. The cloud server may determine the verification code of the smart door lock based on the time period the trigger time belongs to. For example, the cloud server may determine the verification code of the smart door lock based on the beginning time or integral time of the time period the trigger time belongs to. In some embodiments, the cloud server may convert the trigger time and the private key seed into a digital password, for example, a six-digit password using the preset first verification code generation algorithm.

Correspondingly, the smart door lock may generate verification codes at different time periods using the same preset verification code generation algorithm (e.g., the preset first verification code generation algorithm) as the cloud server generating the verification code. As used herein, a verification code generated by the smart door lock may be also referred to as a reference verification code. The smart door lock (e.g., a processor installed in the smart door lock) may generate a reference verification code for a time period based on the local private key seed stored in the smart door lock (e.g., a storage device installed in the smart door lock). Specifically, the smart door lock may calculate and store a dynamic password (i.e., reference verification code) of a current time period at the beginning of each time period applying the first verification code generation algorithm. The dynamic password for the current time period may be a verification code of the smart door lock outputted based on a combination of the beginning of each time period and the private key seed. The beginning of a time period as an input parameter of the first verification code generation algorithm may include a beginning time of every hour or half hour in the time period. The cloud server and the smart door lock may use a same verification code generation algorithm to generate verification codes corresponding to each time period. After receiving an input of a verification code by a user via a user interface implemented on the smart door lock, the smart door lock may compare the verification code with a stored verification code (i.e., reference verification code) of the current time period. If the verification code is the same as the stored verification code, the smart door lock may be unlocked; otherwise, the smart door lock may not be opened. In some embodiments, the smart door lock may generate and store the dynamic password (i.e., reference verification code) for each time period based on the local private key seed using a first verification code generation algorithm. The cloud server may generate the dynamic password (i.e., verification code) for the current time period based on the private key seed included in the unlocking verification information, i.e., the reference private key seed, using a second verification code generation algorithm. The first verification code generation algorithm and the second verification code generation algorithm may be the same or different.

In order to eliminate a deviation of the local time of the smart door lock from the time of the cloud server, the time may accurate to an hour level, that is, the time period may be every hour.

In order to increase the time span of a dynamic password, for example, a password generated at 2:59 may be expired after 1 minute and the availability of this dynamic password may be greatly reduced, a buffering mechanism may be added in some embodiments. The buffering mechanism may include an immediately previous dynamic password for the immediately previous hour (or prior time period) which may be reserved when the smart door lock generates the dynamic password for a current hour (or current time period). That is, the dynamic passwords of both the current hour (or current time period) and the immediately previous hour (or prior time period) are valid at any time, which may ensure that the minimum validity period of a dynamic password may be one hour (or one time period) and the maximum validity period of the dynamic password may be two hours (or two consecutive time periods), so as to avoid the dynamic password failure. In some embodiments, the cloud server may generate the verification code corresponding to the trigger time (e.g., 9:59 a.m.) that belongs to a current time period (e.g., 10:00 a.m. to 11:00 a.m.) defined by the cloud server. The smart door lock may generate a first reference verification code by the smart door lock for a current time period (e.g., 10:00 a.m. to 11:00 a.m.) defined by the smart door lock which is different from the current time period (e.g., 10:00 a.m. to 11:00 a.m.) defined by the cloud server because of a deviation of the local time of the smart door lock from the time of the cloud server. The smart door lock may obtain a second reference verification code generated and stored by the smart door lock for a prior time period (e.g., 9:00 a.m. to 10:00 a.m.). The smart door lock may compare the verification code with the first reference verification code and the second reference verification code. If the verification code is the same as one of the first reference verification code and the second reference verification code, the smart door lock may be unlocked; otherwise, the smart door lock may not be opened.

In another one of the two ways, the verification code generated by the cloud server may include a password generation instruction. The cloud server may generate the password generation instruction for making a verification code (i.e., reference verification code) of the smart door lock to be effective in the smart door lock. A user may open the smart door lock using the verification code (i.e., reference verification code). As used herein, the password generation instruction generated by the cloud server may be also referred to as the verification code generated by the cloud server.

The password generation instruction generated by the cloud server may include one or more digits and #*. An input of the password generation instruction may include a start code, a command code, a type code, a validity period code, a password, a password ID, a check code, a time factor, a private key seed, or the like, or a combination thereof.

The check code may be used to verify the legitimacy and integrity of the instruction. The check code may include a different number of digits based on the need for security. The longer the number of digits, the safer it is. At the same time, the generated password generation instruction will be lengthened, which may increase the difficulty of the input for a user. For different usage scenarios, the different number of digits of the check code may be used for different user groups.

A private key seed may be similar to the private key seed of the dynamic password, which may be generated when the door lock is shipped from the factory, written to the smart door lock, and stored in the cloud server simultaneously. The private key of each door lock may be different to ensure that the password generation instruction for each smart door lock is generated safely. In some embodiments, the private key seed may be the private key seed included in the unlocking verification information which is obtained by the mobile terminal in response to detect the unlocking event. The time factor may be associated with the trigger time of the unlocking event.

The password ID may be used for the subsequent management of passwords. In the cloud server, the password ID may correspond to a specific name determined by the user, so that when managing the password list of a door lock, the operation object may be the password ID. The password ID may be optional when generating the password generation instruction.

The command code may be used to add, delete, change, check, etc., the password. Of course, instruction codes (e.g., the type code, the validity period code, or the like, or a combination thereof) behind the command code in the instruction may be different according to different command codes. Other input parameters may be not described in detail here, The input parameters of an algorithm for generating the password generation instruction may include the input parameters as described above, the private key seed, and the trigger time. For example, the password generation instruction may be denoted by a private algorithm ((the start code+the command code+the type code+the validity period code+the password+the password ID), the private key seed, the trigger time).

The validity period code may be used to adjust, determine, and/or control a validity period of the password generation instruction. For example, the validity period of the password generation instruction may be one hour, half of the day, one day, etc. The trigger time may accurate to the day level, and may be 0 o'clock of the same day. Therefore, the validity period of the password generation instruction may be valid for the day of the input. According to the requirements, it is possible to extend the validity period of the password generation instruction by means of time-forward compatibility. For example, if the check code is verified by a 0 o'clock of the current day and 0 o'clock of the yesterday simultaneously, the maximum validity period of the password generation instruction may be extended to be two days.

In some embodiments, the password generation instruction may be generated by combining the dynamic password. The password segment may be removed from the password generation instruction, and a two-digit number may be used to specify which hour of the dynamic password may be used. According to the convention, the two-digit number may be used to specify 100 hours, that is, one of the dynamic passwords during the time period from the beginning of a specific hour to the next 100 hours may be specified as a valid password of the password generation instruction. This method may reduce the password segment in the password generation instruction to two digits, which may reduce the number of digits of the entire password generation instruction.

In order to avoid duplication with the dynamic password, the dynamic password generation mechanism may be reserved by adding a variable factor ensuring the dynamic password not duplicated with dynamic password described above.

The cloud server may return the password generation instruction to the mobile terminal after generating the password generation instruction. The user may make a password of the smart door lock take effect using the password generation instruction displayed on the mobile terminal. For example, the user may make the dynamic password generated using the first verification code generation algorithm take effect on the smart door lock. Especially, the smart door lock may analysis the password generation instruction to generate a valid verification code. After the user input a correct verification code, the smart door lock may be opened. In some embodiments, the dynamic password (i.e., reference verification code) taking effect as the password generation instruction may be generated by the smart door lock based on the local private key seed of the smart door lock using the first verification code generation algorithm. In some embodiments, the smart door lock may analysis the password generation instruction inputted by the user via a user interface implemented on the smart door lock via a panel connected with the smart door lock via a wireless connection (e.g., Bluetooth). The smart door lock may generate a verification code based on the private key seed obtained from the password generation instruction and/or the trigger time using the first verification code generation algorithm. The verification code may be inputted by the user via the user interface implemented on the smart door lock. If the inputted verification code is correct, the smart door lock may be unlocked. In some embodiments, the smart door lock may compare the generated verification code based on the private key seed obtained from the password generation instruction and/or the trigger time using the first verification code generation algorithm with one or more reference verification codes stored in the smart door lock. If the generated verification code matches one of the one or more reference verification codes, the inputted verification code is correct. In some embodiments, the smart door lock may analysis the password generation instruction inputted by the user. If the password generation instruction is correct, the smart door lock may make a reference verification code for a time period when the trigger time belongs to take effect. In some embodiments, the smart door lock may be unlocked when the reference verification code for the time period when the trigger time belongs to takes effect. In some embodiments, the smart door lock may determine that the password generation instruction is correct in response to determine the private key seed included in the password generation instruction is matched with the local private key seed.

Figure 4:
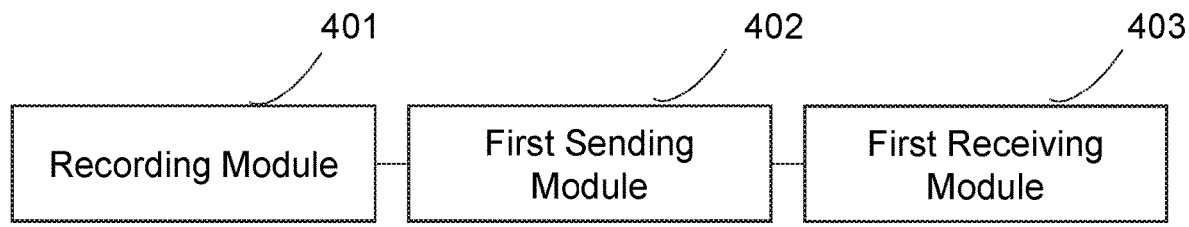
FIG. 4 is a block diagram of a mobile terminal according to some embodiments of the present disclosure.

Corresponding to the above embodiments, the present disclosure also provides a mobile terminal with reference to FIG. 4. FIG. 4 is a block diagram of the mobile terminal according to some embodiments of the present disclosure, wherein the mobile terminal may include:
- a recording module 401 configured to in response to an unlocking event, record a trigger time of the unlocking event;
- a first sending module 402 configured to in response to the unlocking event, send a request for unlocking verification information to a cloud server, wherein the request for the unlocking verification information is used to request the cloud server to return a verification code of a smart door lock, and the unlocking verification information includes a private key seed of the smart door lock and the trigger time of the unlocking event; and
- a first receiving module 403 configured to receive the verification code of the smart door lock for opening the smart door lock generated by the cloud server based on the private key seed and the trigger time.

In some embodiments, the unlocking event may include at least one of a click confirmation operation, a sliding operation, or a login operation by inputting a password or authentication information.

Figure 5:
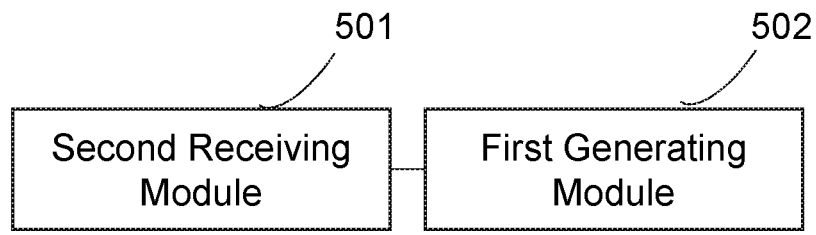
FIG. 5 is a block diagram of a cloud server according to some embodiments of the present disclosure.

Corresponding to the above embodiments, the present disclosure also provides a cloud server with reference to FIG. 5. FIG. 5 is a block diagram of a cloud server according to some embodiments of the present disclosure, wherein the cloud server may include:
- a second receiving module 501 configured to receipt of a request for unlocking verification information from a mobile terminal, the unlocking verification information including a private key seed of a smart door lock and the trigger time recorded by the mobile terminal in response to an unlocking event; and
- a first generating module 502 configured to generate a verification code of a smart door lock after a matching verification of the private key seed is successful and returning the verification code to the mobile terminal for opening the smart door lock.

In some embodiments, the cloud server may be provided with a preset private key seed database configured to store a private key seed of each smart door lock; and the cloud server may further include:
- a verification module configured to compare the private key seed and the private key seed of each smart door lock stored in the preset private key seed database, and determine that the matching verification of the private key seed is successful if a comparison is successful.

In some embodiments, the first generating module 502 may include:
- a generating sub-module configured to generate a verification code using a preset first verification code generation algorithm based on the private key seed and the trigger time within a time period which the trigger time belongs to; and
- a returning sub-module configured to return the verification code to the mobile terminal for opening the smart door.

In some embodiments, the cloud server may further include:
- a second generating module configured to generate a password generation instruction, wherein the password generation instruction is used to make the verification code of the smart door lock take effect in the smart door lock; and
- a returning module configured to return the password generation instruction to the mobile terminal.

In some embodiments, the second generating module may be configured to:
generate the password generation instruction based on a start code, a command code, a type code, a validity period code, a password, a password ID, a time factor, and a private key seed.

Figure 6:
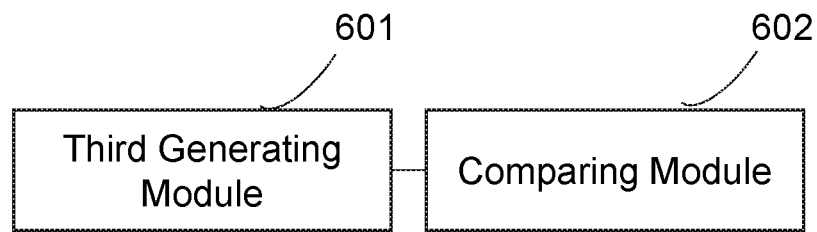
FIG. 6 is a block diagram of a smart door lock according to some embodiments of the present disclosure.

Corresponding to the above embodiments, the present disclosure also provides a smart door lock with reference to FIG. 6. FIG. 6 is a block diagram of the smart door lock according to some embodiments of the present disclosure, wherein the smart door lock may include:
- a third generating module 601 configured to generate a verification code for a current time period using a preset first verification code generation algorithm based on a private key seed of the smart door lock; and
- a comparing module 602 configured to in response to receipt of an inputted verification code, compare the inputted verification code with the verification code for the current time period, and opening the smart door lock if the inputted verification code is same as the verification code for the current time period.

In some embodiments, the smart door lock may further include:
- an effective module configured to make the verification code for the current time period take effect in response to receipt of a password generation instruction.

Figure 7:
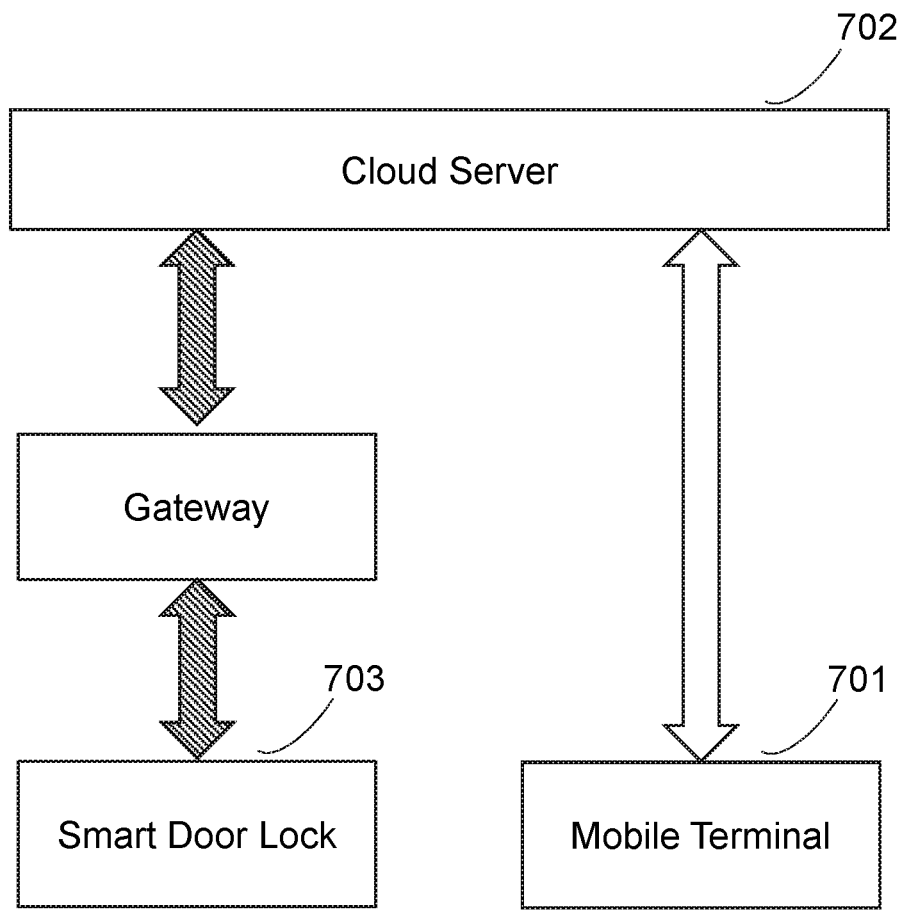
FIG. 7 is a block diagram of a smart door lock system according to some embodiments of the present disclosure.

Corresponding to the above embodiments, the present disclosure also provides a smart door lock system with reference to FIG. 7. FIG. 7 is a block diagram of the smart door lock system according to some embodiments of the present disclosure, wherein the smart door lock system may include: a mobile terminal 701, a cloud server 702, and a smart door lock 703. Shaded arrows between the smart door lock, the gateway, and the cloud server may indicate that no wireless communication is required between the smart door lock, the gateway, and the cloud server. Therefore, a gateway module may not need to be installed, and the smart door lock may not need to be installed with a communication module.

The mobile terminal 701 may be configured to record a trigger time of the unlocking event in response to an unlocking event, send a request for unlocking verification information to a cloud server, wherein the request for the unlocking verification information is used to request the cloud server to return a verification code of a smart door lock, and the unlocking verification information includes a private key seed of the smart door lock and the trigger time;

The cloud server 702 may be configured to generate the verification code of the smart door lock after a matching verification of the private key seed is successful and return the verification code to the mobile terminal for opening the smart door lock;

The smart door lock 703 may be configured to generate a verification code for a current time period using a preset first verification code generation algorithm based on a private key seed of the smart door lock; in response to receipt of an inputted verification code, compare the inputted verification code with the verification code for the current time period, the smart door lock being unlocked if the inputted verification code is the same as the verification code for the current time period.

The serial numbers of the embodiments are for the purpose of description only and do not represent the advantages and disadvantages of the embodiments.

In the embodiments of the present disclosure, the descriptions of each embodiment have its own emphasis, and parts not detailed in one certain embodiment may be referred to in the related descriptions of other embodiments.

In several embodiments provided by the present disclosure, it should be understood that the disclosed technical contents may be implemented in other manners. The device embodiments described above are only illustrative. For example, the division of the units may be a logical function division. In practice, there may be another division mode, such as multiple units or components can be combined or integrated into another system, or some features can be ignored or not executed. Another point is that the coupling or direct coupling or communication connection shown or discussed may be indirect coupling or communication connection through some interfaces, units or modules, and may be electrical or other forms.

The units described as separate components may or may not be physically separated, and the components shown as units may or may not be physical units, i.e., it may be located in one place, or may be distributed over a plurality of units. Some or all of the units may be selected according to actual needs to achieve the purpose of the embodiments of the present disclosure.

In addition, the functional units in the various embodiment of the present disclosure may be integrated into one processing unit, may be physically present separately for each unit, or may be integrated into one unit by two or more units. The integrated unit can be implemented in the form of hardware or software functional unit.

The above is only the preferred implementation of the present disclosure. It should be pointed out that for those skilled in the art, without departing from the principles of this application, a number of improvements and modifications can also be made, and these improvements and modification should also be considered as the scope of protection of the present disclosure.

I claim:

1. A method for offline verification code generation based on a smart door lock system, comprising:
   in response to an unlocking event, recording, by a mobile terminal, a trigger time of the unlocking event;
   in response to the unlocking event, sending, by the mobile terminal, a request for unlocking verification information to a cloud server based on the unlocking event, wherein the request for the unlocking verification information is used to request the cloud server to return a verification code of a smart door lock, and the unlocking verification information includes a private key seed of the smart door lock;
   receiving, by the mobile terminal, the verification code of the smart door lock for opening the smart door lock generated by the cloud server based on the private key seed and the trigger time.

2. The method for offline verification code generation based on the smart door lock system of claim 1, wherein the unlocking event includes at least one of a click confirmation operation, a sliding operation, or a login operation by inputting a password or authentication information generated via a user interface implemented on the mobile terminal.

3. The method for offline verification code generation based on the smart door lock system of claim 1, further comprising:
   receiving, by the cloud server, the request for unlocking verification information from the mobile terminal; and
   generating, by the cloud server, the verification code of the smart door lock in response to a determination that a matching verification of the private key seed is successful; and
   returning the verification code to the mobile terminal for opening the smart door lock.

4. The method for offline verification code generation based on the smart door lock system of claim 3, wherein the cloud server is provided with a preset private key seed database that is configured to store multiple reference private key seeds of multiple smart door locks, and the method further includes:
   comparing, by the cloud server, the private key seed with the reference private key seeds stored in the preset private key seed database; and
   determining that the matching verification of the private key seed is successful in response to a determination that one of the reference private key seeds matches with the private key seed of the smart door lock.

5. The method for offline verification code generation based on the smart door lock system of claim 3, wherein the generating the verification code of the smart door lock includes:
   generating, by the cloud server, the verification code using a preset first verification code generation algorithm based on the private key seed and the trigger time within a time period which the trigger time belongs to.

6. The method for offline verification code generation based on the smart door lock system of claim 3, wherein the generating the verification code of the smart door lock includes:
   generating, by the cloud server, a password generation instruction based on the private key seed of the smart door lock, wherein the password generation instruction is used to make a reference verification code of the smart door lock take effect in the smart door lock; and
   designating, by the cloud server, the password generation instruction as the verification code.

7. The method for offline verification code generation based on the smart door lock system of claim 6, wherein the generating, by the cloud server, the password generation instruction includes:

generating, by the cloud server, the password generation instruction based on at least one of a start code, a command code, a type code, a validity period code, a password, a password ID, a time factor, and the private key seed.

8. The method for offline verification code generation based on the smart door lock system of claim 1, wherein the method further includes:
   receiving, by the smart door lock, the verification code inputted by a user;
   generating, by the smart door lock, a reference verification code corresponding to a current time period using a preset second verification code generation algorithm based on the private key seed of the smart door lock; and
   comparing, by the smart door lock, the verification code generated by the cloud server with the reference verification code generated by the smart door lock, the smart door lock being unlocked if the verification code is same as the reference verification code.

9. The method for offline verification code generation based on the smart door lock system of claim 8, further including:
   making, by the smart door lock, the reference verification code take effect in response to receipt of the verification code generated by the cloud server.

10. A smart door lock system, comprising: a cloud server, a mobile device, and a smart door lock, wherein:
    the mobile terminal is configured to record a trigger time of an unlocking event in response to the unlocking event, send a request for unlocking verification information to the cloud server, wherein the request for the unlocking verification information is used to request the cloud server to return a verification code of the smart door lock, and the unlocking information includes a private key seed of the smart door lock and the trigger time;
    the cloud server is configured to generate the verification code of the smart door lock after a matching verification of the private key seed is successful and return the verification code to the mobile terminal for opening the smart door lock;
    the smart door lock is configured to generate a reference verification code for a current time period using a preset verification code generation algorithm based on the private key seed of the smart door lock; and in response to receipt of the verification code inputted by a user, compare the verification code with the reference verification code for the current time period, the smart door lock being unlocked if the input verification code is the same as the reference verification code for the current time period.

* * * * *